Patented Apr. 23, 1929.

1,709,982

UNITED STATES PATENT OFFICE.

ERWIN HOFFA AND HANS HEYNA, OF HOCHST-ON-THE-MAIN, GERMANY, ASSIGNORS TO GRASSELLI DYESTUFF CORPORATION, OF NEW YORK, N. Y., A CORPORATION OF DELAWARE.

PROCESS FOR PREPARING DYESTUFFS OF THE THIOINDIGO SERIES.

No Drawing. Application filed December 16, 1926, Serial No. 155,334, and in Germany December 19, 1925.

Our present invention relates to a new process of preparing dyestuffs of the thioindigo series.

We have found that the oxythionaphthenes acylated in the hydroxyl group of the thiophene nucleus, which correspond to the general formula:

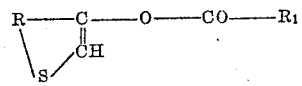

wherein R stands for any aryl residue substituted or not and $R_1$ for hydrogen, an alkyl or aryl group, and which may be obtained by condensing arylthioglycollic-1-carboxylic acids with an acylating agent such as acetic anhydride, react easily with cyclic ortho-diketones containing a five-membered ring, not less than four of which are carbon atoms, and the fifth atom being sulfur, nitrogen or carbon, for instance with isatins or 2.3-diketodihydrothionaphthenes or with substitution products or reactive derivatives thereof, as, for instance, α-anils or α-halogen compounds, whereby condensation takes place and valuable dyestuffs are formed.

The following examples serve to illustrate our invention, but they are not intended to limit it thereto, all parts being by weight:

1. 21 parts of 5.7-dichlorisatin are heated, until dissolved, in 250 parts of phosphorus pentachloride and there is then added thereto a suspension of 24 parts of naphthalene-3.2-(3'-acetoxy-1'-thiophene) of the formula:

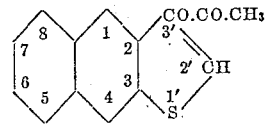

in 250 parts of benzene. The mass is heated to boiling for a short time. The dyestuff thus obtained is separated from the benzene. It has probably the formula:

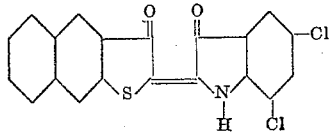

and dyes cotton a blue tint.

Instead of the pure naphthalene-3.2-(3'-acetoxy-1'-thiophene) there may also be used the crude product obtainable by boiling a mixture of naphthalene-2.3-thioglycol-carboxylic acid, acetic anhydride and anhydrous sodium acetate. If the condensation is carried out with the α-chlorides of isatin, bromisatin, dibromisatin and dichlorisatin, there are, in every case, obtained blue vat dyestuffs.

2. 10 parts of 4-methyl-6-chlor-3-oxythionaphthene are diluted with 100 parts of glacial acetic acid, and there are slowly added thereto at a temperature of between 15 and 20° C., while stirring, 15 parts of bromine or 13.5 parts of sulfurylchloride. The oxythionaphthene dissolves with evolution of hydrogen halide. There is then run into the mass a solution in 50 parts of glacial acetic acid of the product obtainable by boiling 17 parts of 4-bromnaphthalene-3.2-thioglycolcarboxylic acid together with 3 parts of anhydrous sodium acetate and 16 parts of acetic anhydride. 1 part of pyridine is added to the mixture and the whole is then heated to boiling. The resulting dyestuff is separated from the glacial acetic acid. It has probably the formula:

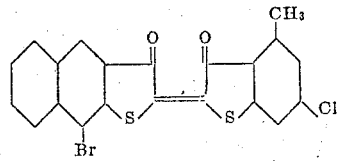

It dyes cotton reddish-violet tints.

3. The condensation product from 10 parts of 4-bromnaphthalene-3.2-thioglycolboxylic acid, 9 parts of acetic anhydride and 2 parts of sodium acetate is mixed with 50 parts of glacial acetic acid and added to a suspension of 6,5 parts of isatin-β-anil in 50 parts of glacial acetic acid. The mass is heated to boiling until there is no further formation of dyestuff. The dyestuff thus obtained has probably the formula:

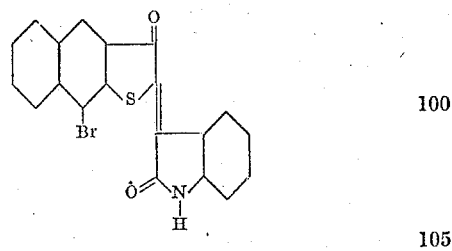

It dyes cotton claret-red tints. The isatin-β-anil can be obtained according to the methods indicated in the literature. (cf. Pummerer, Berichte der deutschen chemischen Gesellschaft, Vol. 43, page 1380; Knövenagel, Journal für praktische Chemie, Vol. 89, page 46.)

4. 25 parts of naphthalene-3.2-(3'-acetoxy-1'-thiophene) are heated to boiling in 25 parts of glacial acetic acid together with 21 parts of 5.7 dichlorisatin and 1 part of concentrated hydrochloric acid, until the formation of the dyestuff is complete. The dyestuff thus obtained is separated from the glacial acetic acid. It has probably the formula:

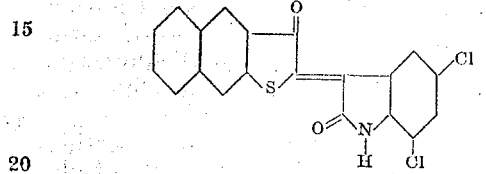

and dyes cotton brownish-red tints.

5. There are heated to boiling 25 parts of naphthalene - 3.2 - (3' - acetoxy - 1' - thiophene) in 25 parts of glacial acetic acid together with 21 parts of 4-methyl-6-chlor-2.3-diketothionaphthene in 25 parts of glacial acetic acid and 1 part of concentrated hydrochloric acid. When no further dyestuff precipitates, the mass is cooled to 30–40° C. and the dyestuff is isolated in the usual manner. It has probably the formula:

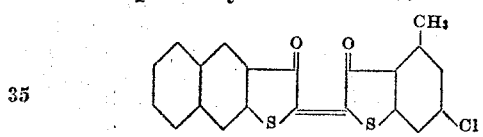

It dyes cotton a greyish-violet tint.

6. 25 parts of naphthalene-3.2-(3'-acetoxy-1'-thiophene) are heated to boiling in 25 parts of glacial acetic acid together with 18 parts of acenaphthenequinone and 1 part of concentrated hydrochloric acid. If there is no further formation of dyestuff, the dyestuff produced is separated from the glacial acetic acid. It has probably the formula:

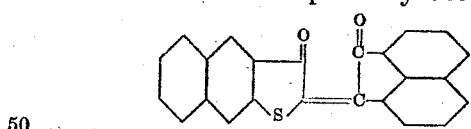

It dyes cotton red tints of good properties as to fastness.

7. 25, 4 parts of 3-benzol-hydroxythionaphthene are heated to boiling for a short time in 50 parts of glacial acetic acid with 32 parts of 4-methyl-6-chlor-2.3-diketodihydrothionaphthene - (p - dimethylamino) - 2 - anil. The dyestuff thus obtained has probably the formula:

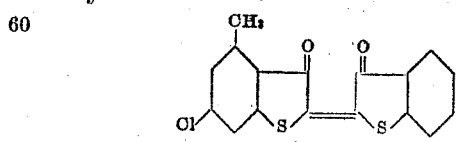

After being cooled and filtered by suction and washed until neutral, it dyes cotton red tints of excellent properties as to fastness.

We do not claim herein the method of producing dyestuffs of the thioindigo series which consists in condensing the aforementioned oxythionaphthenes acylated in the hydroxyl group of the thiophene nucleus with the 2-anils of the 2.3-diketodihydro-1-thionaphthenes, having claimed this special process in our application Ser. No. 729,637, filed August 1, 1924.

Furthermore we wish it to be understood that the term "cyclic ortho-diketones" is intended to comprise aromatic and heterocyclic ortho-diketones as well as the derivatives and substitution products thereof, as for instance isatin, substituted isatins, the isatin-α-derivatives, thionaphthene and the derivatives thereof.

We claim:

1. Process for preparing dyestuffs of the thioindigo series which consists in condensing compounds of the general formula:

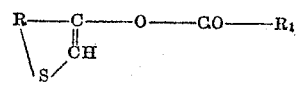

wherein R stands for an aryl residue which may be substituted and $R_1$ for hydrogen, an alkyl or aryl group with bodies containing a five membered ring not less than four of which are carbon atoms and the fifth atom being sulfur, nitrogen or carbon, and in which one is combined with =O and the other with a readily reducible group that is known to be replaceable by an indigoid forming component.

2. Process for preparing dyestuffs of the thioindigo series which consists in condensing compounds of the general formula:

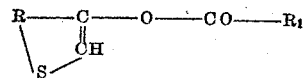

wherein R stands for an aryl residue which may be substituted and $R_1$ for hydrogen, an alkyl or aryl group with bodies containing a five membered ring, not less than four of which are carbon atoms and the fifth atom being sulfur or nitrogen, and in which one of two adjacent carbon atoms is combined with =O and the other with a readily reducible group that is known to be replaceable by an indigoid forming component.

3. Process for preparing dyestuffs of the thioindigo series which consists in condensing compounds of the general formula:

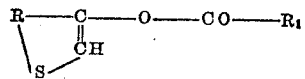

wherein R stands for an aryl residue which may be substituted and $R_1$ for hydrogen, an alkyl or aryl group with bodies of the following general formula:

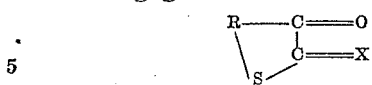

wherein R stands for an aryl residue which may be substituted, X for =O or =(halogen)$_2$ or =N.aryl.

4. Process for preparing dyestuffs of the thioindigo series which consists in condensing compounds of the general formula:

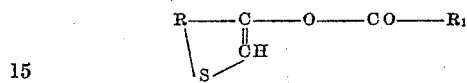

wherein R stands for an aryl residue which may be substituted and R$_1$ for hydrogen, an alkyl or aryl group with bodies of the following general formula:

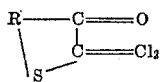

wherein R stands for an aryl residue which may be substituted.

5. Process for preparing dyestuffs of the thioindigo series which consists in condensing compounds of the general formula:

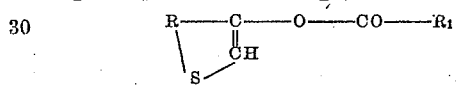

wherein R stands for an aryl residue which may be substituted and R$_1$ stands for hydrogen, an alkyl or aryl group with bodies of the formula:

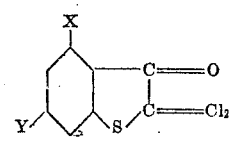

wherein X stands for hydrogen or a methyl group and Y for hydrogen or a halogen.

6. Process for preparing dyestuffs of the thioindigo series which consists in condensing compounds of the general formula:

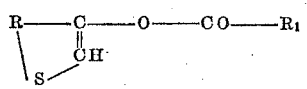

wherein R stands for an aryl residue which may be substituted and R$_1$ for hydrogen, an alkyl or aryl group with 4-methyl-6-chlor-2-dichlor-3-ketodihydro-1-thionaphthene of the formula:

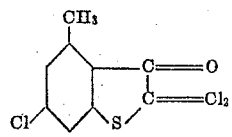

In testimony whereof, we affix our signatures.

ERWIN HOFFA.
HANS HEYNA.